United States Patent
Fletcher

(10) Patent No.: US 9,603,340 B2
(45) Date of Patent: Mar. 28, 2017

(54) DOG TRAINING COLLAR WITH NON-PENETRATING CONES

(71) Applicant: Mitchell F. Fletcher, Eden, MD (US)

(72) Inventor: Mitchell F. Fletcher, Eden, MD (US)

(*) Notice: Subject to any disclaimer, the term of this patent is extended or adjusted under 35 U.S.C. 154(b) by 0 days.

(21) Appl. No.: 15/198,060

(22) Filed: Jun. 30, 2016

(65) Prior Publication Data
US 2017/0000086 A1    Jan. 5, 2017

Related U.S. Application Data

(60) Provisional application No. 62/188,260, filed on Jul. 2, 2015.

(51) Int. Cl.
*A01K 27/00* (2006.01)
*A01K 15/02* (2006.01)

(52) U.S. Cl.
CPC ............ *A01K 27/001* (2013.01); *A01K 15/02* (2013.01)

(58) Field of Classification Search
CPC ................................ A01K 27/001; A01K 15/02
USPC ....... 119/862, 863, 864, 856, 831, 712, 905, 119/718
See application file for complete search history.

(56) References Cited

U.S. PATENT DOCUMENTS

| | | | |
|---|---|---|---|
| 205,515 A * | 7/1878 | Culin ................... | A01K 27/001 119/862 |
| 4,202,293 A | 5/1980 | Gondu et al. | |
| 5,647,303 A * | 7/1997 | Deioma ............... | A01K 27/001 119/864 |
| 6,606,967 B1 * | 8/2003 | Wolfe, Jr. ............. | A01K 15/02 119/856 |
| 6,796,274 B1 | 9/2004 | Moynihan | |
| 6,938,580 B2 * | 9/2005 | Herbst ................. | A01K 27/001 119/864 |
| 7,267,082 B2 * | 9/2007 | Lalor ................... | A01K 27/009 119/859 |
| D612,552 S * | 3/2010 | Matz ........................... | D30/160 |
| 7,886,701 B1 | 2/2011 | Gordon | |
| 8,356,579 B2 | 1/2013 | Sullivan | |
| 8,919,295 B2 * | 12/2014 | Voellmecke ......... | A01K 27/001 119/856 |
| D749,803 S * | 2/2016 | Urbanczyk .................. | D30/160 |
| 9,326,489 B2 * | 5/2016 | Ritzdorf ............... | A01K 27/001 |

* cited by examiner

*Primary Examiner* — Yvonne Abbott-Lewis
(74) *Attorney, Agent, or Firm* — Miller Law Group, PLLC

(57) ABSTRACT

A dog training collar provides aversion training without requiring the use of a conventional pinch collar structure. The dog training collar has a series of spikes mounted on the inner side of the collar diametrically opposite the position of the buckle of the collar when mounted on a canine. The spikes are formed as truncated cones of plastic that have a rounded apex so as not to injure the canine during utilization. The spikes can be formed as pairs mounted on a base that is positioned on the interior of the collar with the spikes projecting through openings on the inner side of the collar. The rounded apex on the cones allows the collar to be worn comfortably until the leash is pulled to engage the spikes into the neck of the canine being trained. The exterior of the collar has the look of a standard flat buckle dog collar.

19 Claims, 6 Drawing Sheets

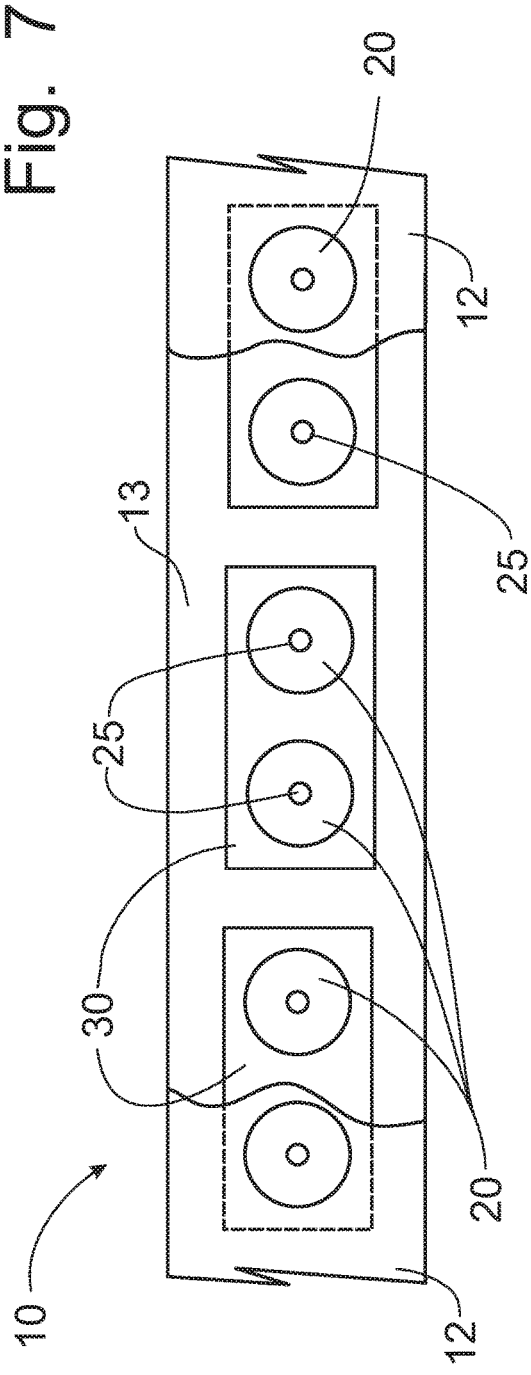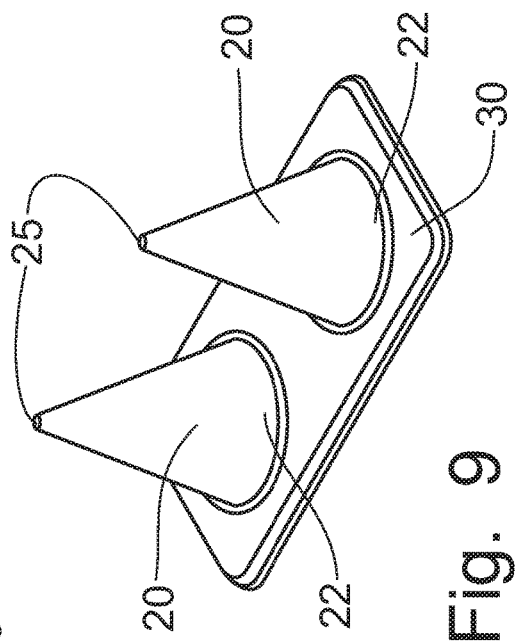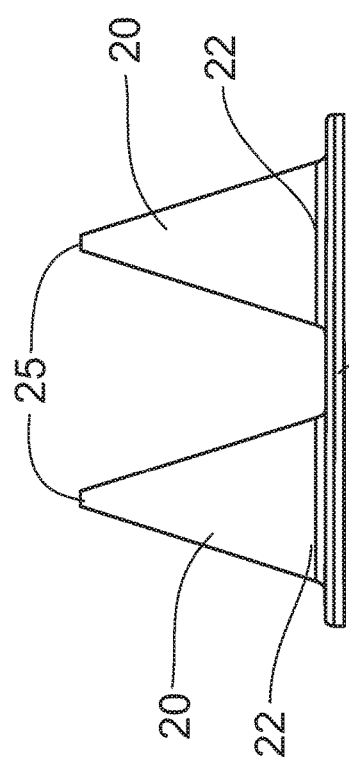

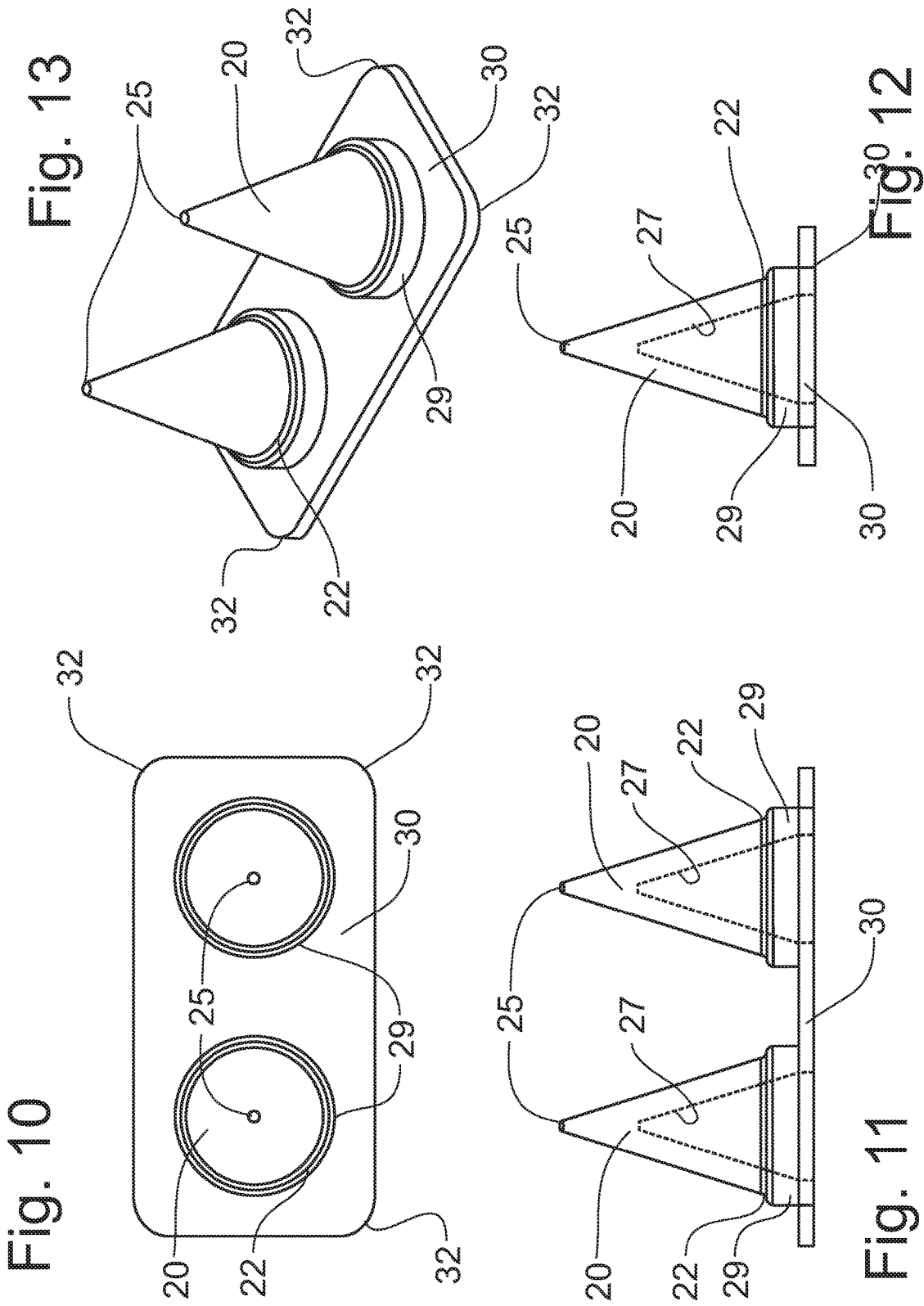

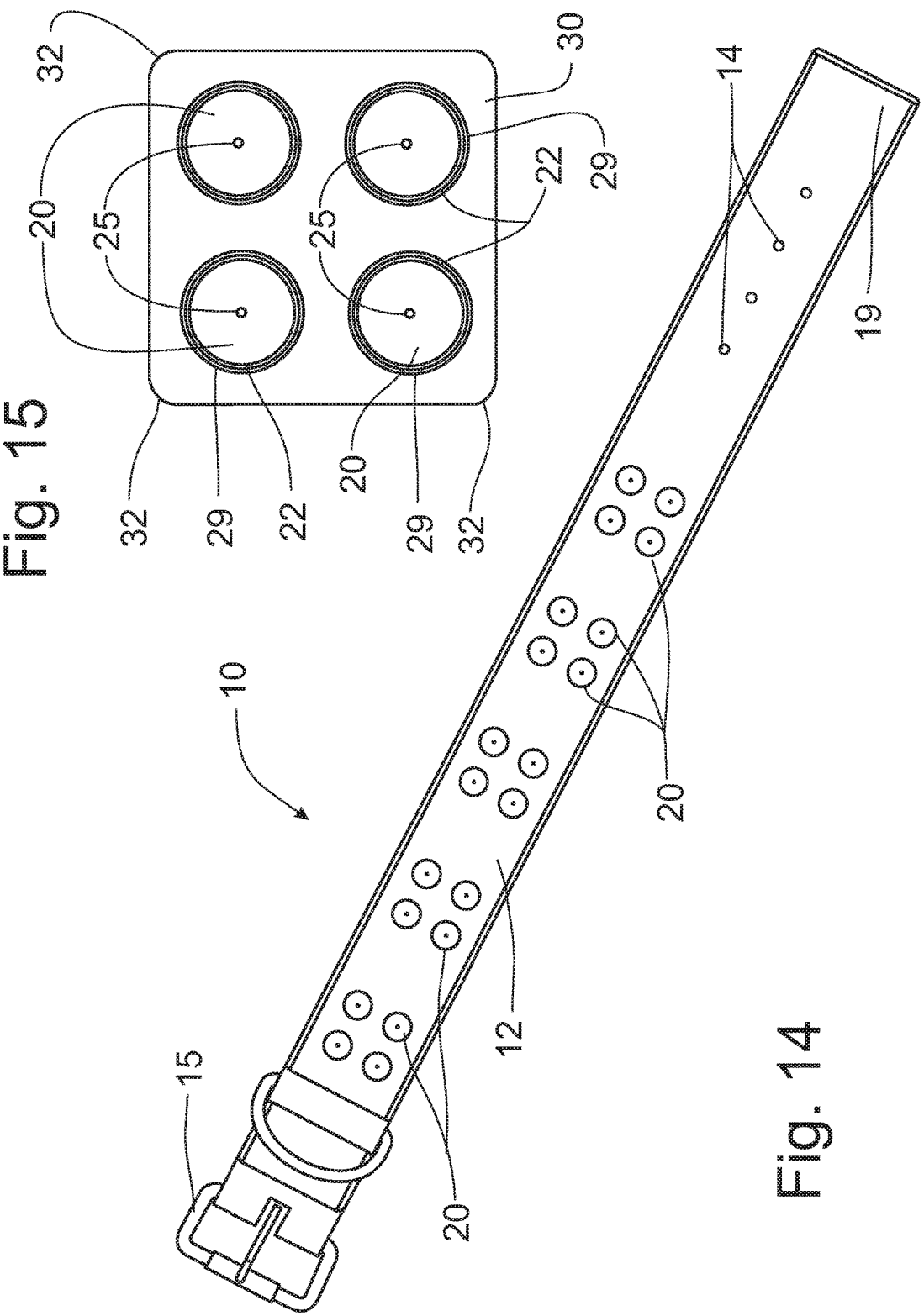

DOG TRAINING COLLAR WITH NON-PENETRATING CONES

CROSS-REFERENCE TO RELATED APPLICATIONS

This application claims domestic priority on U.S. Provisional Patent Application Ser. No. 62/188,260, filed on Jul. 2, 2015, the content of which is incorporated herein by reference.

FIELD OF THE INVENTION

The present invention relates generally to a dog collar for use to train a canine, and more particularly, to a dog training collar having non-penetrating cone-shaped spikes to press against the neck of the animal.

BACKGROUND OF THE INVENTION

Dog collars have been used in different configurations to train canines for many years. Some of the more simpler dog collars are choke collars in which one end of the collar slidably receives the body of the collar and the lead is attached to the free end of the collar such that pulling the lead (leash) results in the canine being choked to control the movement of the animal, similar to the dog collar disclosed in U.S. Pat. No. 7,886,701, granted on Feb. 15, 2011, to Barbara Gordon. Similarly, the dog control apparatus disclosed in U.S. Pat. No. 6,796,274, granted to John Moynihan on Sep. 28, 2004, incorporates a slip lead mechanism engaged with the dog's muzzle that results in lowering the dog's head when tension is applied. Other dog collars have been sold as training devices, but few have been effective in making a significant change in the behavior of the animal. Some such dog collars are focused on a more passive approach to training the animal and are devoid of any corrective qualities or attributes.

One popular dog training collar incorporating traditional structure for changing canine behavior is often referred to as a pinch or prong collar. The pinch collar is generally an all-metal collar and often draws criticism because of the appearance of the collar. The pinch collar is often referred to as looking like a medieval torture device because of the large protruding prongs on the inside surface of the training collar. The pinch collar has other drawbacks in that the links of the all metal dog collar can be difficult to remove and reconnect, which is attributable in at least part to the inflexible properties of the metal from which the pinch collar is constructed. However, such collars do create an aversion in the animal that results in long lasting changes in canine behavior.

One alternative to the pinch collar is presented in U.S. Pat. No. 8,356,579, granted to Don Sullivan on Jan. 22, 2013, in which the respective links of the pinch collar are pivotally interconnected and incorporate a releasable fastener that connects adjacent collar links. In the Sullivan pinch collar, the number of links can be adjusted to provide a better fit for differently sized dogs. Nevertheless, the V-shaped prongs 24, 26 on each respective link of the dog collar retain the distinctive appearance that is often found to be displeasing to dog owners.

Other dog collar devices incorporate a higher level of technology by incorporating electronics that emit a noise or a deliver an electrical shock in response to input from either the dog or the owner. One such collar is disclosed in U.S. Pat. No. 4,202,293, granted on May 13, 1980, to Gerald Gonda, et al, which can emit a sound or provide an electrical shock to the animal in response to the dog barking. Similar approaches are used in invisible fences for dogs in which the dog wears a shock collar that delivers an electrical shock to the dog's neck whenever the animal gets too close to a wire buried in the ground to define the territory in which the canine is free to move about.

Accordingly, it would be desirable to provide a training dog collar that would be effective in providing an aversive for a canine without utilizing the conventional pinch collar. It would also be desirable to provide an effective training dog collar that is easy to apply to the animal.

SUMMARY OF THE INVENTION

It is an object of this invention to overcome the disadvantages of the prior art by providing a training dog collar that allows the use of aversive training for a canine without utilizing a conventional pinch collar structure.

It is another object of this invention to provide a dog training collar that includes cones positioned on the inside of the collar for pressing against the neck of the dog during training activities.

It is a feature of this invention that the cones located on the inside of the dog collar are truncated.

It is an advantage of this invention that the truncated cones do not injure the dog during utilization for aversive training sessions.

It is another feature of this invention that the cones are formed in pairs and positioned internally of the collar structure to project therefrom through openings in the inside portion of the dog training collar.

It is another advantage of this invention that the cones will rest gently against the neck of the dog until pressure is applied by the trainer or handler via pulling on the leash to provide aversive training.

It is still another advantage of this invention that pulling on the leash connected to the training dog collar enables the trainer or handler to utilize force to train a dog without requiring significant physical effort on behalf of the trainer or handler.

It is still another feature of this invention that the cones can be formed of a plastic material, such as polyvinylchloride (PVC), into a conical shape.

It is yet another feature of this invention that the cones are formed with a base positioned at the inner side of the collar with the apex of the cones spaced away from the inner side of the collar so as to press into the neck of the animal when desired.

It is yet another advantage of this invention that the rounded apex of each cone is not sharp so as to cause discomfort to the canine.

It is a further advantage of this invention that the canine can wear the dog training collar without discomfort unless the leash is pulled to apply pressure from the collar onto the neck of the canine.

It is a further feature of this invention that the cones are positioned on the inner side of the dog training collar at a position diametrically opposite the buckle of the dog training collar and extend approximately 90 degrees to both sides of the collar so that the cones engage the throat and sides of the neck of the canine.

It is still another advantage of this invention that the training dog collar has the appearance of a standard flat buckle dog collar, as the outer side of the training dog collar has a conventional dog collar appearance.

It is still another object of this invention to provide a dog training collar which is durable in construction, inexpensive of manufacture, carefree of maintenance, facile in assemblage, and simple and effective in use.

These and other objects, features and advantages are accomplished according to the instant invention by providing a dog training collar that provides aversion training without requiring the use of a conventional pinch collar structure. The dog training collar has a series of spikes mounted on the inner side of the collar diametrically opposite the position of the buckle of the collar when mounted on a canine. The spikes are formed as truncated cones of plastic that have a rounded apex so as not to injure the canine during utilization. The spikes can be formed as pairs mounted on a base that is positioned on the interior of the collar with the spikes projecting through openings on the inner side of the collar. The rounded apex on the cones allows the collar to be worn comfortably until the leash is pulled to engage the spikes into the neck of the canine being trained. The exterior of the collar has the look of a conventional, standard flat buckle dog collar.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 7 is an enlarged partial top plan view of the inner side of the dog training collar shown in FIG. 5 with a portion of the inner side of the collar being broken away to shown the structure of the spikes;

FIG. 8 is an enlarged side elevational view of the preferred configuration of the spike structure with a pair of conical spikes being mounted on a base member that is confined within the interior of a dog training collar incorporating the principles of the instant invention;

FIG. 9 is an enlarged perspective view of the spike structure shown in FIG. 8;

FIG. 10 is an enlarged top plan view of an alternative spike structure;

FIG. 11 is an enlarged side elevational view of the spike structure depicted in FIG. 10 with dashed hidden lines that depict a hollow interior of the respective spike members;

FIG. 12 is an enlarged end elevational view of the spike structure shown in FIG. 11;

FIG. 13 is an enlarged perspective view of the spike structure shown in FIG. 10;

FIG. 14 is a top plan view of an alternative dog training collar incorporating the principles of the instant invention; and FIG. 15 is an enlarged top plan view of the spike structure utilized within the dog training collar shown in FIG. 14.

DETAILED DESCRIPTION OF THE PREFERRED EMBODIMENT

Figure 1:
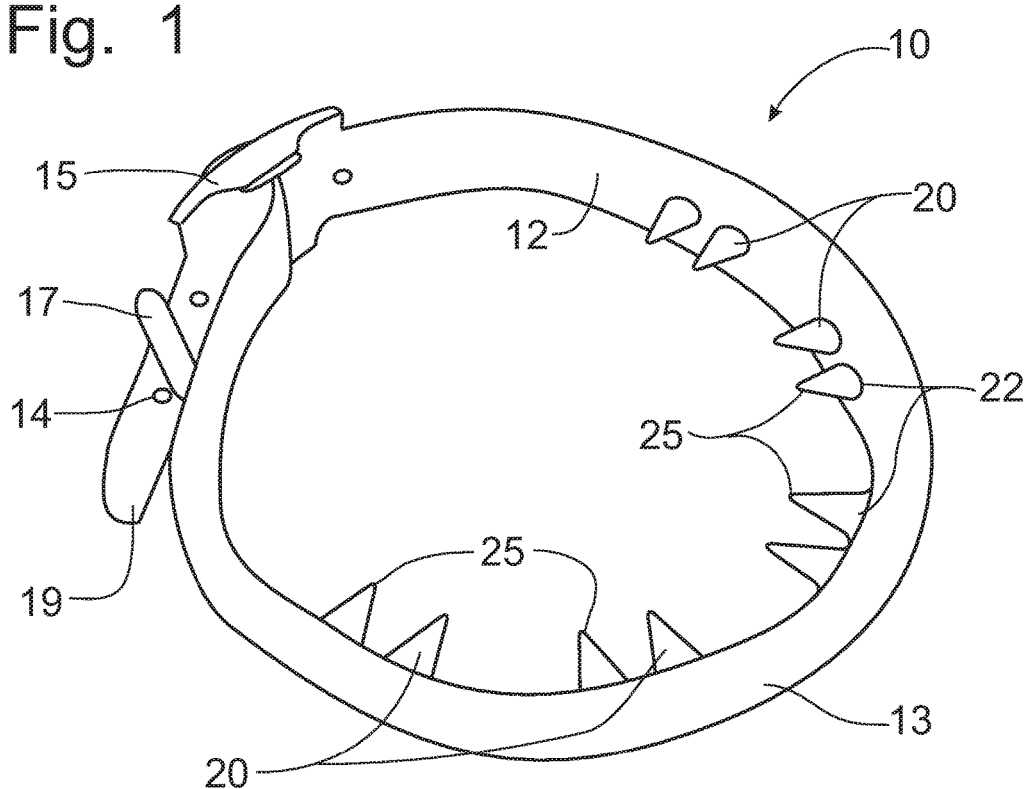
FIG. 1 is a upper perspective rear view of a training dog collar incorporating the principles of the instant invention, the dog collar being shown in an assembled configuration, as though being fastened on a canine.
Figure 2:
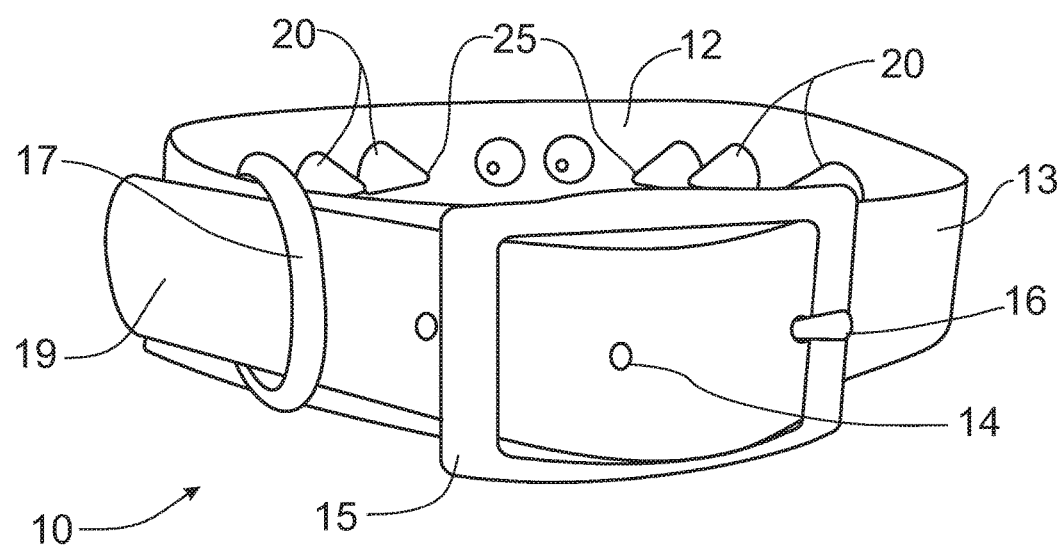
FIG. 2 is a front perspective view of the training dog collar shown in FIG. 1.
Figure 3:
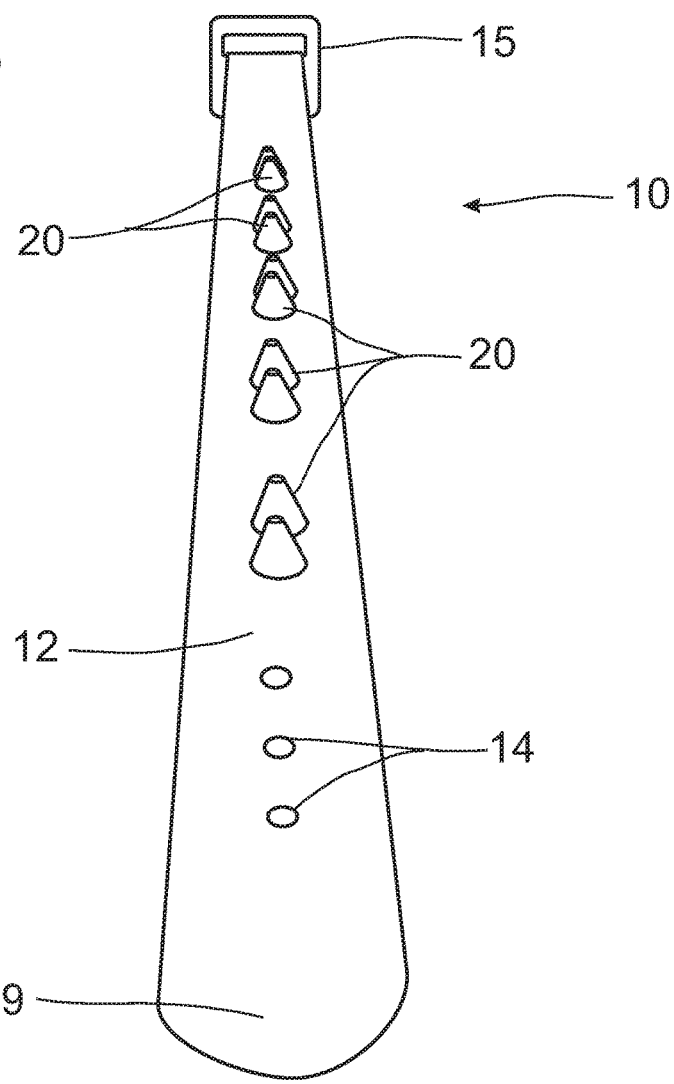
FIG. 3 is a perspective view of the training dog collar unfastened and stretched out into a linear format, the inside surface normally against the body of the canine being shown on the upper surface of the dog collar.
Figure 4:
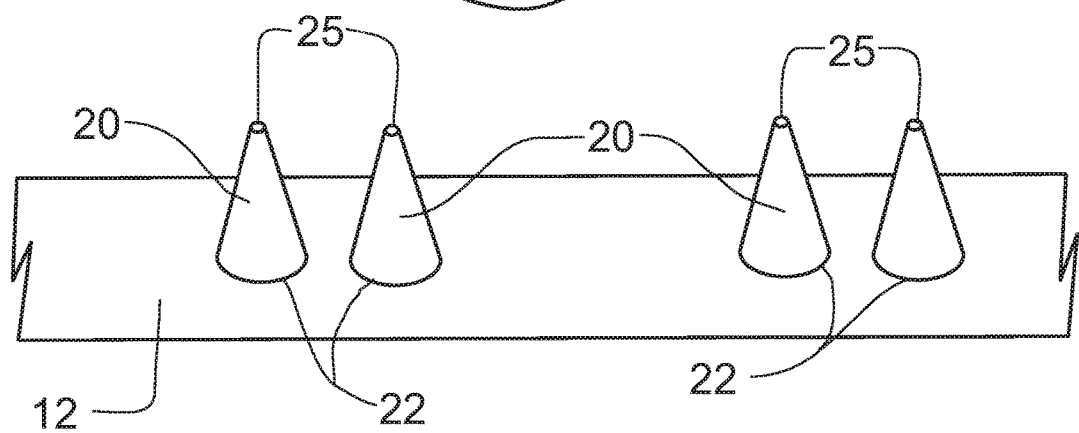
FIG. 4 is an enlarged perspective view of a portion of the training dog collar looking orthogonally to the perspective view shown in FIG. 3.

Referring to the drawings, a training dog collar 10 incorporating the principles of the instant invention can best be seen. The training dog collar 10 has an inner side 12 that is placed against the neck of the canine on which the dog collar 10 is to be fastened and an outer side 13 that is the opposing side of the dog collar 10 that is facing outwardly from the animal. The training dog collar 10 has a standard flat buckle 15 cooperable with the distal end 19 of the body of the dog collar to fasten the dog collar 10 around the neck of the canine in a conventional manner.

The inner side 12 is inlayed with multiple plastic, non-penetrating, cone-shaped spikes 20 that project toward the neck of the canine wearing the training dog collar 10. The spikes 20 will rest gently against the neck of the dog until pressure is applied by the trainer or handler by pulling on the leash (not shown) which is typically attached to the bale 17 adjacent the buckle 15. When the bale 17 is attached to the leash which is being held by the trainer or handler, the buckle 15 and bale 17 are located on the back of the neck of the dog, thus positioning the spikes 20 around the lower portion and sides of the animal's neck. Thus, from the perspective of the public, the training dog collar 10 has the same general appearance of a standard flat buckle dog collar.

Pulling on the leash (not shown) connected to the training dog collar 10 enables the trainer or handler to utilize compulsion, which is the act of using force to train a dog, without as much physical effort on behalf of the trainer or handler as is normally required with other collars, including the pinch collar, or harnesses. Applying the training dog collar 10 to the canine is as simple as placing a flat buckle collar onto the canine. The nature of the training dog collar 10 allows the canine to wear the dog collar 10 even when not being trained or supervised. The training dog collar 10 has no protruding parts that can be hooked on environmental structures, such as a crate, fence, carpet or gate. The adjustment in size of the training dog collar 10 is done the same as is done for simple flat buckle collars, which is to fit the collar 10 around the neck of the dog and passing the distal end 19 through the flat buckle 15 and inserting the catch 16 into the appropriate one of the holes 14 proximate to the distal end 19.

Figure 5:
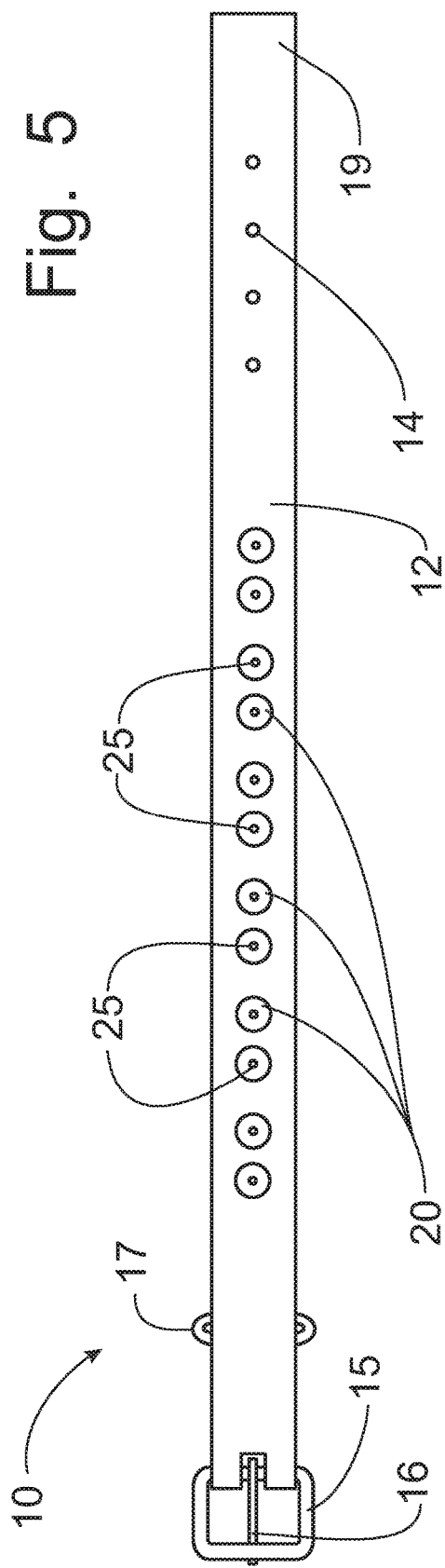
FIG. 5 is a plan view of the inner side of an alternate configuration of a dog training collar incorporating the principles of the instant invention.
Figure 6:
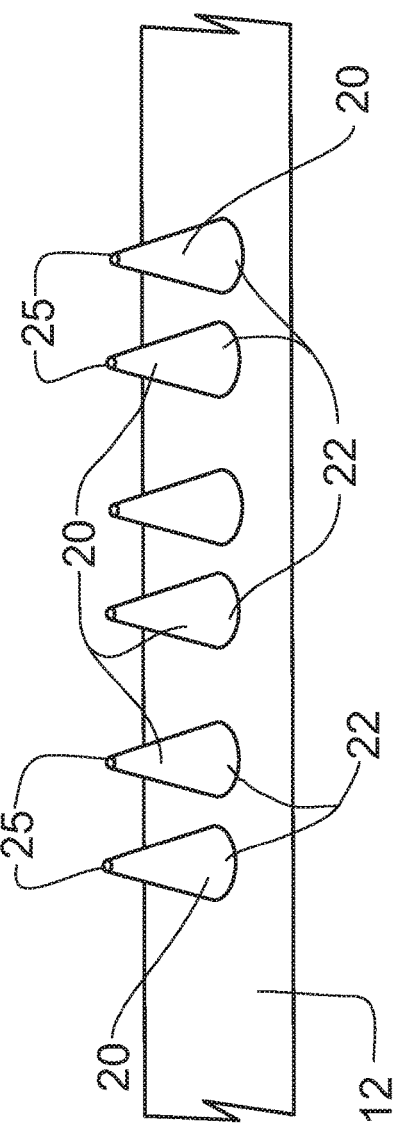
FIG. 6 is an enlarged perspective view of a portion of the dog training collar depicted in FIG. 5.

A slightly different configuration of the dog training collar 10 is depicted in FIGS. 5-7 wherein the spike structures 20 are supported within the interior of the collar 10 in closer proximity than the spikes 20 shown in the first embodiment depicted in FIGS. 1-4. In this configuration, the spike structures 20 are mounted internally of the collar structure 10 between an outer layer 13 and an inner layer 12 which can then be secured together in a number of ways, as described in greater detail below. Alternatively, the spike structures 20 can be fastened to the inner side of a single layer of dog collar 10 to provide an effective configuration.

As best seen in FIGS. 8 and 9, the spikes 20 are preferably formed of a plastic material, such as polyvinylchloride (PVC) and are formed in a conical shape with the base 22 of the cone positioned at the inner side 12 of the collar 10 with the apex 25 spaced away from the inner side 12 so as to press into the neck of the animal on which the dog collar 10 is fastened. The apex 25 is rounded with a radius so as not to be sharp and cause discomfort to the canine. Accordingly, the canine can wear the dog collar 10 without discomfort unless the lead (leash) is pulled to apply pressure from the collar 10 onto the neck of the canine. The spikes 20 are preferably mounted in pairs, as is seen in FIGS. 9-15, to provide stability for the mounting of the spikes 20 within the collar 10; however, the spikes 20 can be mounted on the inner side 12 in spaced singles as well. Preferably, the spikes 20 are integrally formed with the support base 30 which is a flat generally rectangular member extending around the base of the spikes 20.

Preferably, the area of the inner side 12 of the collar 10 on which the spikes 20 are mounted is located diametrically opposite the buckle 15 and extend approximately 90 degrees to both sides of the collar 10 (diametrically opposite being defined with respect to the mounting of the dog collar 12 on the canine so that the spikes 20 engage the throat and sides of the neck of the canine). Even when pressure is applied to the collar 10 by pulling on the leash, the spikes 20 are not configured to cause injury to the canine. The rounded apex 25 of each spike 20 exerts some pain to the canine without causing injury so that the aversion technique of training can be utilized effectively. Thus, the spikes 20 will rest gently against the neck of the canine giving the handler or trainer the ability to efficiently utilize compulsion, i.e. the act of using force to train a dog, without much physical effort and without injury to the animal.

More specifically, the conical spikes 20, as depicted in FIGS. 8 and 9, can be formed to have a height of 0.8 inches from the apex 25 to the bottom of the support base 30 with the base having a thickness of approximately 0.075 inches, a width of approximately 0.75 inches and a length of about 1.5 inches. The apexes 25 of each pair of spikes 20 can be formed to be approximately 0.75 inches apart with each apex having a diameter of approximately 0.0355 inches rounded with a radius of about 0.0125 inches. With the base 22 of the spike 20 having a diameter of approximately 0.4 inch the sides of the conical spikes 20 would project upwardly from the support base 30 at an angle of approximately 72.6 degrees. The spikes 20 can be hollow, as is depicted in FIGS. 11 and 12, to provide some flexibility in application. More particularly, the plastic spikes 20 can be easily modified at the discretion of the end user by clipping the tip of the spike 20 with sheers or scissors, and/or by sanding the tip 25 with sand paper to provide a less intense sensation to the dog wearing the collar 10.

An alternative configuration of the spikes 20 can be seen in FIGS. 10-13. As noted above, the spike members 20 can be modified at the tip or apex 25 at the discretion of the user, and to accommodate such modification, the tip 25 of the spike 20 is provided with sufficient material that can be removed without exposing the hollow core 27. In the configuration of the spikes 20 shown in FIGS. 10-13, each respective spike 20 is supported on top of a base collar 29 that elevates the cone above the support base 30 a distance preferably corresponding to the thickness of the material overlying the support base 30 to form the dog training collar 10. The base collar 29 defines perpendicular surfaces for the spike structure 20 to keep the spikes 20 within the structure of the dog training collar 10. As with the configuration of the spikes 20 shown in FIGS. 8 and 9, the base 22 of the conical spike 20 is rounded to present a curved surface to the material forming the inner side 12 of the dog training collar 10 to lessen the stresses applied to the material of the inner side 12 and the associated risk of tearing the material.

Referring now to FIGS. 14 and 15, an alternative configuration of the dog training collar 10 can best be seen. The dog training collar 10 shown in FIG. 14 is preferably used with large breed dogs and is preferably about two inches wide. The spikes 20 are formed as two pairs on the support base 30 to span the width of the dog training collar 10. As shown in FIGS. 10-13, the spikes 20 are preferably formed as hollow members with a base collar 29 elevating the conical spikes 20 above the support base 30 the general thickness of the collar material.

The spike members 20 are preferably formed by injection molding with the mold permitting the hollow structure of the individual spikes 20 that projects through the support base 30 and is open through the support base 30. This hollow configuration for the spikes 20 enables the spikes 20 to have less weight, which reflects on the overall weight of the dog training collar 10. Furthermore, the support base 30 is formed with rounded corners 32 that lessen the stresses imposed on the material forming the inner side 12 of the dog training collar 10 and helps maintain integrity of the collar 10 during usage.

The dog collar 10 made according to the principles of the instant invention provides an effective training collar that has the appearance of a standard flat buckle dog collar, as the outer side 13 of the collar has a conventional, standard flat buckle dog collar appearance. The spikes 20 are simple, but very effective while maintaining a humane approach to training a dog through the aversion technique. The spikes 20 are non-penetrating but still deliver the aversive sensation to the animal. The training dog collar 10 can be left on the animal even when not being trained as the collar 10 has no parts that will be caught on exterior structures, as is found on conventional pinch collars. Further, the collar 10 can be left on the animal even when the animal is crated without fear of the collar causing damage to the canine.

The body of the collar 10 can be formed of any conventional material found on standard flat buckle dog collars, including nylon, leather, canvas, plastic, rubber, and other typical materials. The spikes 20 can be secured to the body of the collar 10 in a number of different ways, including fasteners, adhesives, or even integrally molded. Preferably, the spikes 20 are inlaid through the collar 10 to project from the inner side 12. Accordingly, the training collar 10 can be made in distinctive colors, fashion styles and from multiple textiles. The training collar 10 can be formed in multiple sizes to properly fit differently sized canines from small to large in size.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A dog collar for training a canine animal through an aversion technique of training, comprising:
  an elongated body having a buckling device at a buckling end, and a remote distal end, said elongated body including an inner side that is worn against the body of the canine animal and an outer side that is visible externally when the dog collar is worn on the canine animal; and a plurality of fixed conical spikes mounted on the inner side of the elongated body, each spike being formed of a plastic material and having a base positioned at the inner side of the elongated body and terminating an apex spaced from said inner side, each apex being rounded so as to present a rounded tip, said fixed conical spikes being located diametrically opposite to said buckling device so as to be engagable against the neck of the canine animal when worn thereby.

2. The dog collar of claim 1 wherein said buckling device is a flat buckle that is cooperable with holes formed in the elongated body proximate to the distal end thereof.

3. The dog collar of claim 2 wherein said spikes are located only on the inner side of the elongated body and are positioned diametrically opposite the flat buckle when the dog collar is worn by the canine animal, the spikes extending in opposing directions to locate spikes along the throat and sides of the neck of the canine animal wearing the dog collar and the buckling end is connected to a leash.

4. The dog collar of claim 3 wherein said spikes are formed in pairs that are spaced along the inner side of the elongated body.

5. The dog collar of claim 4 wherein said pair of spikes are mounted on a single base member.

6. The dog collar of claim 5 wherein the spikes are mounted directly to the inner side of the dog collar.

7. The dog collar of claim 5 wherein the base member is positioned between an inner layer of said dog collar and an outer layer of said dog collar with the spikes projecting through openings in said inner layer.

8. The dog collar of claim 5 wherein said outer side has an appearance of a conventional, standard flat buckle dog collar.

9. A dog training collar for training a canine animal, comprising:

a collar member having an inner side positioned against the canine animal when worn, and an outer side opposite said inner side, said collar member further having a buckle at one end of said collar member engagable with a distal end of said collar member to create a loop when worn on said canine animal, said collar member being connectable to a leash proximate to said buckle; and a series of cones positioned on said inner side and projecting from said inner side toward engagement with said canine animal, each said cone having a base portion and an opposing apex, each said apex being rounded to avoid injury to said canine animal when engaged therewith, said cones being located diametrically opposite to said buckle so as to be engagable against a throat of said canine animal when said leash pulls against said collar member.

10. The dog training collar of claim 9 wherein said cones are integrally formed with a base member, said base member being connected to said collar member at said inner side.

11. The dog training collar of claim 10 wherein said cones are formed in pairs with a corresponding base member.

12. The dog training collar of claim 11 wherein said base member is rectangular and is mounted internally of said collar member between an inner layer and an outer layer.

13. The dog training collar of claim 9 wherein said cones are mounted directly to said inner side of said collar member.

14. The dog training collar of claim 9 wherein said outer side is devoid of said cones.

15. A canine training device for use in conjunction with aversion training technique for canine animals, comprising:

a collar member having an inner side positioned against the canine animal and an outer side opposite said inner side and facing away from said canine animal, said collar member further having a buckle at a first end of said collar member engagable with a distal end of said collar member to create a loop worn around a neck of said canine animal, said collar member being connectable to a leash proximate to said buckle; and a series of spikes positioned on said inner side and projecting from said inner side toward engagement with said canine animal, each said spike having a base portion and an opposing apex, each said apex being rounded to avoid injury to said canine animal when engaged therewith, said spikes being located diametrically opposite to said buckle when said collar member is formed into said loop so as to be engagable against a throat of said canine animal when said leash pulls against said collar member.

16. The canine training device of claim 15 wherein said spikes are formed as plastic cones connected to said inner side of said collar member.

17. The canine training device of claim 16 wherein said spikes are formed as a pair integrally connected to a base member, said base member being connected to said inner side of said collar member.

18. The canine training device of claim 17 wherein said base member is captured internally of said collar member between an inner layer and an outer layer with said spikes projecting through said inner layer for engagement with said canine animal.

19. The canine training device of claim 15 wherein said spikes are connected directly to said inner side of said collar member, said outer side of said collar member being devoid of said spikes.

* * * * *